April 8, 1924.

E. E. MILLER

EXPANSIBLE PACKING

Filed Nov. 9, 1921

1,489,608

INVENTOR
ERWIN E. MILLER
BY Hazard Miller
his ATT'YS.

Patented Apr. 8, 1924.

1,489,608

UNITED STATES PATENT OFFICE.

ERWIN E. MILLER, OF FULLERTON, CALIFORNIA.

EXPANSIBLE PACKING.

Application filed November 9, 1921. Serial No. 514,115.

*To all whom it may concern:*

Be it known that I, ERWIN E. MILLER, a citizen of the United States, residing at Fullerton, in the county of Orange and State of California, have invented new and useful Improvements in Expansible Packings, of which the following is a specification.

My invention relates to pistons and more particularly to mechanism for effecting the automatic expansion of the packing ring so as to automatically absorb the wear of the packing and to thereby prevent the leakage of fluid past the piston.

A purpose of my invention resides in the provision of an expansible packing comprised in a piston which includes heads, a spring interposed between the heads, and means operable by the spring for radially expanding the packing ring, one of the heads being adjustable to vary the tension exerted upon the spring and to thereby vary the pressure with which the packing ring is expanded.

I will describe one form of piston head embodying my invention and will then point out the novel features thereof in claims.

In the accompanying drawings.

Similar reference characters refer to similar parts in each of the several views.

Figure 1:
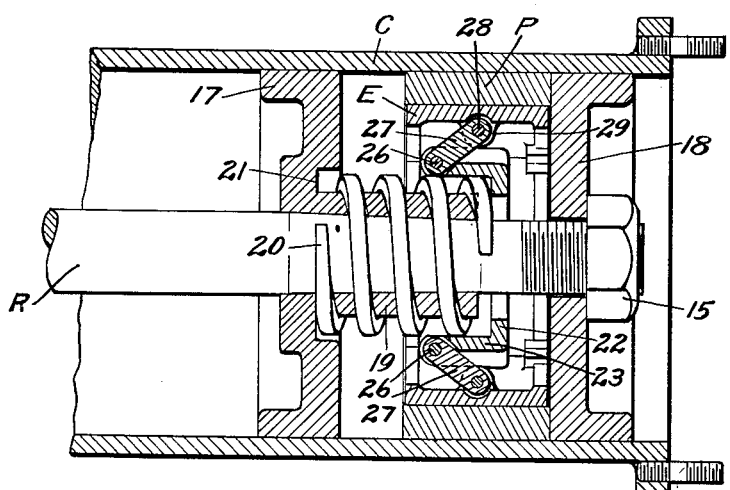
Figure 1 shows in vertical longitudinal section a cylinder having therein one form of piston including an expansible packing embodying my invention.

My invention comprises, in its present embodiment, a piston rod R having one end tapered and threaded to receive an adjusting nut 15 and a lock nut 16. Sustained on the rod is a piston including a fixed head 17 and an adjustable head 18, the former being provided with a sleeve 19 which embraces the tapered portion of the rod and thereby secures the head 17 against movement on the rod beyond the point shown. Arranged between the heads 17 and 18 is a packing ring designated at B and formed of rubber or the like. This ring is adapted to be engaged by the expanding mechanism for maintaining it in sealing contact with the walls of the cylinder designated at C.

Figure 4:
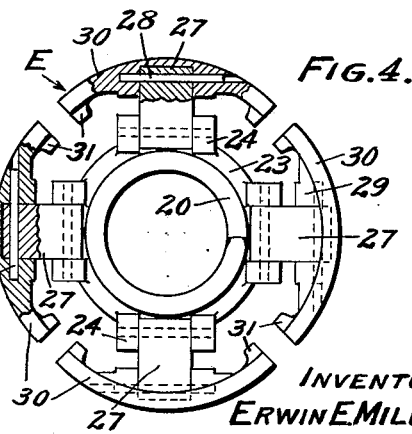
Fig. 4 is a detail view, partly in section, showing the expanding mechanism for the ring.

The expanding mechanism comprises in the present instance a coiled expansible spring 20 which surrounds the sleeve 19 with one end disposed in a groove 21 of the head 17, and the opposite end bearing against the flange 22 formed on one edge of a collar 23 whereby the ring is normally urged in the direction of the head 18. As illustrated to advantage in Fig. 4, the collar 23 is provided with a plurality of pivot ears 24 arranged in pairs, with the ears of each pair receiving the opposite ends of a pivot pin 26 for pivotally supporting thereon one end of a link 27. The opposite end of the link 27 is likewise pivotally mounted on a pin 28 mounted in ears 29 formed on an expanding rim designated at E. The expanding rim is made of a plurality of segmental sections designated at 30, each section being formed at its ends with inwardly extending projections 31 which are designed to prevent overlapping of the sections during the insertion of the rim into the packing ring P.

Figure 2:
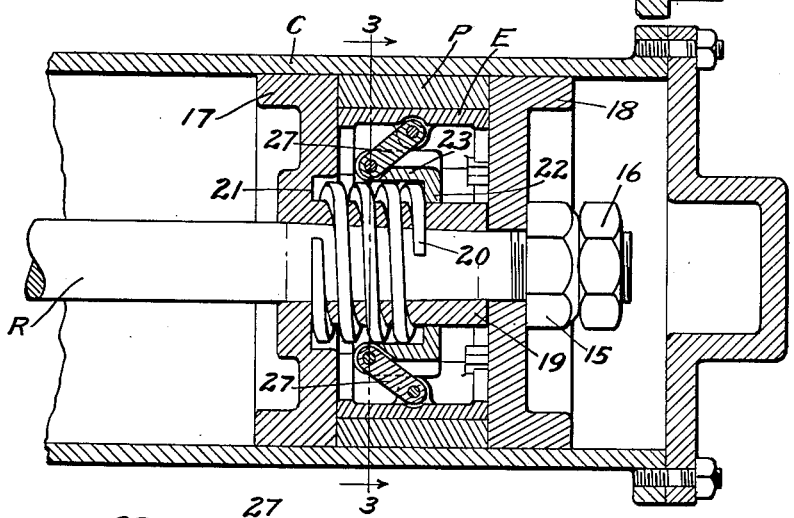
Fig. 2 is a view similar to Fig. 1 with the adjustable head in final position and a spring under tension with the packing ring in expanded position.
Figure 3:
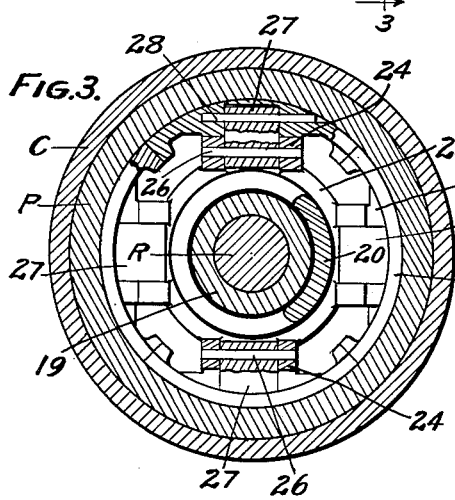
Fig. 3 is a transverse sectional view taken on the line 3—3 of Fig. 2.

In practice, the expansion of the packing ring P is effected by an adjustment of the head 18 inwardly toward the head 17. This adjustment is effective by an inward feeding of the adjusting nut 15, and under the inward movement of the head 18, the packing ring is engaged to cause a corresponding inward movement of the collar 23 through the rim E and the links 27. This obviously causes a compression of the spring 20 so that after the head 18 has been finally adjusted as shown in Fig. 2, the spring functions to urge the collar forwardly in the direction of the head 18 which obviously effects a radial movement of the sections 30 comprising the rim through the medium of the links 27. Under the expanding action of the sections, the packing ring is expanded and consequently forced outward into firm engagement with the walls of the cylinder.

Although I have herein shown and described only one form of expanding packing embodying my invention, it is to be understood that various changes and modifications may be made herein without departing from the spirit of the invention and the spirit and scope of the appended claims.

What I claim is:

1. A piston comprising spaced heads, a packing ring arranged between the heads, a rim formed in sections movable radially to expand the ring, a collar having radial links bearing on the rim, a spring engageable with the collar for urging the sections radially, and means for adjusting one of the heads to effect a compression of said spring.

2. A piston comprising a rod having a tapered end, a head including a sleeve fitted on said tapered end, a collar surrounding the sleeve and rod and having a flange formed thereon, an expansible spring surrounding the sleeve between said collar and head and engaging said flange, a rim formed of segmental sections, links pivotally connecting the sections with said collar, a packing ring embracing the rim, a second head mounted on said rod and engageable with said ring and means for adjusting the second head for the purpose described.

3. A piston comprising a rod having a tapered end, a head including a sleeve fitted on said tapered end, a collar surrounding the sleeve and rod and having a flange formed thereon, an expansible spring surrounding the sleeve between said collar and head and engaging said flange, a rim formed of segmental sections, projections formed on the confronting ends of the sections of said rim, links pivotally connecting the sections with said collar, a packing ring embracing the rim, a second head mounted on said rod and engageable with said rim, and a nut threadedly fitted on the rod and engageable with the second head for moving the latter in the direction of the piston ring to effect movement of said collar with a consequent compression of said spring.

4. A piston comprising a rod, heads sustained in spaced relation on the rod, a collar arranged between the heads, a rim composed of movable sections operatively connected to the collar, thrust links reaching between said collar and rim, a packing ring surrounding the rim, and a spring between the heads and engaging said collar for normally urging the sections of the rim radially to effect the expansion of the packing ring.

5. A piston comprising spaced heads, a packing ring arranged between the heads, a rim within the ring and formed in sections so as to be expansible radially to expand the rim, a member movable axially between the heads, a resilient member engaging the first member for urging the latter in one direction, and pivoted means operatively connecting the sections of the rim with the first member whereby the rim is expanded to effect expansion of the packing ring under the action of said resilient member.

6. A piston comprising spaced heads, a packing ring arranged between the heads, a rim within the ring and formed in sections so as to be expansible radially to expand the rim, a member movable axially between the heads, a resilient member engaging the first member for urging the latter in one direction, and toggle connections operatively connecting the sections of the rim with the first member whereby the rim is expanded to effect expansion of the packing ring under the action of said resilient member.

7. A piston comprising spaced heads, a collar arranged between the heads, a rim composed of movable sections having pivotal connections with the collar, a packing ring surrounding the rim, and means between the heads and engaging the collar for normally urging the sections through the medium of the pivotal connections, radially to effect the expansion of the packing ring.

8. A piston comprising spaced heads, a member movable between the heads and urged in one direction, an expansible rim between the heads and exteriorly of the member, a packing ring surrounding the rim, and pivoted means operable by the member for extending the rim to effect an expansion of the packing ring.

9. A piston comprising spaced heads, a member movable between the heads and urged in one direction, an expansible rim between the heads and exteriorly of the member, a packing ring surrounding the rim, and links pivoted to the member and to the rim at points at that side of the first pivots in which the member is urged.

In testimony whereof I have signed my name to this specification.

ERWIN E. MILLER.